United States Patent
Ormesher et al.

(10) Patent No.: US 9,461,499 B2
(45) Date of Patent: Oct. 4, 2016

(54) PERSONAL WIRELESS CHARGING SYSTEM

(71) Applicant: Everpurse, Inc., Chicago, IL (US)

(72) Inventors: Liz Salcedo Ormesher, Chicago, IL (US); Daniel Salcedo, Chicago, IL (US)

(73) Assignee: Everpurse, Inc., Chicago, IL (US)

(*) Notice: Subject to any disclaimer, the term of this patent is extended or adjusted under 35 U.S.C. 154(b) by 141 days.

(21) Appl. No.: 14/022,181

(22) Filed: Sep. 9, 2013

(65) Prior Publication Data

US 2015/0015196 A1    Jan. 15, 2015

Related U.S. Application Data

(60) Provisional application No. 61/679,910, filed on Sep. 7, 2012, provisional application No. 61/845,158, filed on Jul. 11, 2013.

(51) Int. Cl.
  *H02J 7/00*   (2006.01)
  *H02J 7/02*   (2016.01)
  *H02J 5/00*   (2016.01)

(52) U.S. Cl.
  CPC .............. *H02J 7/025* (2013.01); *H02J 7/0045* (2013.01); *H02J 5/005* (2013.01); *H02J 7/0054* (2013.01); *H02J 7/02* (2013.01)

(58) Field of Classification Search
  CPC ....................................... H02J 7/025
  USPC ......................................... 320/108
  See application file for complete search history.

(56) References Cited

U.S. PATENT DOCUMENTS

| | | | |
|---|---|---|---|
| 7,889,494 B2 | 2/2011 | Stampfli | |
| 2010/0201312 A1* | 8/2010 | Kirby et al. | 320/108 |
| 2012/0098484 A1 | 4/2012 | Cheng et al. | |
| 2012/0235505 A1* | 9/2012 | Schatz et al. | 307/104 |
| 2013/0257368 A1* | 10/2013 | Lau et al. | 320/108 |
| 2013/0285605 A1* | 10/2013 | Partovi | 320/108 |
| 2014/0000771 A1* | 1/2014 | Sherman et al. | 150/106 |
| 2014/0306654 A1* | 10/2014 | Partovi | 320/108 |
| 2015/0015180 A1* | 1/2015 | Miller et al. | 320/103 |
| 2015/0015195 A1* | 1/2015 | Leabman et al. | 320/108 |

FOREIGN PATENT DOCUMENTS

| | | |
|---|---|---|
| KR | 1020070079482 A | 8/2007 |
| KR | 100819753 B1 | 4/2008 |
| KR | 1020110034773 A | 4/2011 |

* cited by examiner

*Primary Examiner* — Suresh Memula

(74) *Attorney, Agent, or Firm* — Richards Patent Law P.C.

(57) ABSTRACT

The present disclosure provides wireless personal electronic charging systems including a personal storage item including a storage location for a portable electronic device, the personal storage item further includes a power section including a wireless induction charger receiver and a system battery configured to receive and store power from the wireless induction charger receiver. The personal storage item further includes a connector in electrical communication with the power section and, when a portable electronic device including a device battery is located within the storage location, in electrical communication with the device battery, wherein the connector transfers power from the power section to the device battery when the connector is connected to the portable electronic device.

15 Claims, 6 Drawing Sheets

PERSONAL WIRELESS CHARGING SYSTEM

CROSS-REFERENCE TO RELATED APPLICATIONS

This application incorporates by reference and claims priority to U.S. Provisional Application 61/697,910 filed on Sep. 7, 2012, and U.S. Provisional Application 61/845,158 filed on Jul. 11, 2013.

BACKGROUND OF THE INVENTION

The present subject matter relates generally to systems for charging personal electronic devices.

People rely heavily on their mobile devices, particularly their cellular phones. However, the battery life of the mobile devices is fairly limited. For example, with respect to a mobile phone, the battery may last two to four hours in a talk mode, and two days in standby mode. Often, portable electronic devices stop functioning due to an inadequate battery lifetime, leaving a user feeling stranded without any means of communication. In addition, beyond inconvenience, the lack of battery power may be dangerous in emergency situations or in remote areas.

The conventional method of charging mobile devices typically involves physically plugging the mobile device into a power outlet using a power cord. However, power outlets are sometimes difficult to find, such as in a restaurant or when the user is in transit. Further, the user may not be able to remain at the location of the power outlet for the time required for the mobile device to recharge. In other words, many current charging methods are stationary and do not allow a user to charge his mobile device when a power outlet is not available.

Accordingly, there is a need for systems and methods directed to charging personal electronic devices without relying on stationary power sources and while the user is in transit.

BRIEF SUMMARY OF THE INVENTION

The present disclosure provides systems for charging personal electronic devices. Various examples of the systems are provided herein.

The present disclosure provides a wireless personal electronic charging system wherein a wireless electric charger for mobile electronic devices is incorporated into a personal storage item, such as a personal bag, briefcase, or article of clothing. The incorporation of the wireless electric charger into a personal storage item allows users to charge their mobile devices while on the go without the needing to resort to using stationary power outlets to charge their devices. Further, careful integration of an inductive charging technology into the present system enables users to conveniently charge their mobile charger by simply placing the personal storage item, such as a bag, onto an inductive charging mat.

In an embodiment, the wireless personal electronic charging system comprises a personal storage item including a storage location for a portable electronic device, the personal storage item further includes a power section including a wireless induction charger receiver and a system battery configured to receive and store power from the wireless induction charger receiver. In an example, the personal storage item may be a personal bag or an article of clothing. The storage location may be a pocket. The pocket may include a docking system, as disclosed below.

The personal storage item further includes a connector in electrical communication with the power section and, when a portable electronic device including a device battery is located within the storage location, in electrical communication with the device battery, wherein the connector transfers power from the power section to the device battery when the connector is connected to the portable electronic device. In an example, the connector may include a 30-pin connector, a 9-pin connector, a mini USB connector, a micro USB connector, or combinations thereof.

In one example, the system further includes a docking system located within the storage location, wherein the docking system is configured such that the weight of the portable electronic device facilitates an electrical connection between the connector and the device battery when the portable electronic device is placed in the docking system and the docketing system is oriented in a connection-making orientation. For example, when the storage location is a pocket in a purse, gravity may facilitate an electrical connection between a mobile phone and the connector when the user simply drops the mobile phone into the pocket and the purse is held upright.

The system may include a power controller in communication with the wireless induction charger receiver, the system battery, and the connector, wherein the power controller directs power received from the wireless induction charger receiver to the device battery when the connector is connected to the portable electronic device and the device battery is not fully charged.

In another example, the system includes a power controller in communication with the wireless induction charger receiver, the system battery, and the connector, wherein the power controller directs power received from the wireless induction charger receiver to the system battery when a portable electronic device is connected to the connector and the device battery is fully charged or when a portable electronic device is not connected to the connector.

The system may further include a wireless induction charger transmitter configured to receive power from a power source. The wireless induction charger transmitter may be embodied in a charging base. For example, when the wireless induction charger transmitter is connected to a power source and the personal storage item is placed on the charging base, the wireless induction charger receiver receives power wirelessly from the wireless induction charger transmitter.

The charging base and the personal storage item each may include corresponding magnets laid out in a specific pattern designed to attract each other to align the wireless induction charger receiver with the wireless induction charger transmitter to optimize the power delivery between the wireless induction charger transmitter and receiver. The magnets help to ensure the charging base and the personal storage item align in the optimal position without requiring overly precise placement by the user.

In another embodiment, the wireless personal electronic charging system comprises a wireless induction charger transmitter including a power cord adapted to connect the wireless induction charger transmitter to a power source, and a personal storage item including a storage location for a portable electronic device. The personal storage item further includes a power section including a wireless induction charger receiver and a system battery configured to receive and store power from the wireless induction charger receiver. The personal storage item also includes a connector in electrical communication with the power section and, when a portable electronic device including a device battery is located within the storage location, in electrical communication with the device battery. When the wireless induction charger transmitter is connected to a power source and the personal storage item is placed on the wireless induction charger transmitter, the wireless induction charger receiver receives power wirelessly from the wireless induction charger transmitter. The connector transfers power from the power section to the device battery when the connector is connected to the portable electronic device.

In an example, the personal storage item further comprises a power controller in communication with the wireless induction charger receiver, the system battery, and the connector, wherein the power controller directs power received from the wireless induction charger receiver to the device battery when the connector is connected to the portable electronic device and the device battery is not fully charged.

The personal storage item may further include a power controller in communication with the wireless induction charger receiver, the system battery, and the connector, wherein the power controller directs power received from the wireless induction charger receiver to the system battery when a portable electronic device is connected to the connector and the device battery is fully charged or when a portable electronic device is not connected to the connector. The power controller uses programmed logic to determine the appropriate distribution of power between the wireless induction charger receiver, the system battery, and the device battery.

An advantage of the present systems is that users may charge their portable electronic devices throughout the day, thereby extending the battery life of their devices while away from a stationary charging station.

A further advantage of the present systems is that the charging system is incorporated into a personal storage device, such as a bag, briefcase, backpack, article of clothing, among others, which provides users a convenient charging system that does not require an additional item to carry for charging their devices.

Another advantage of the present systems is the battery of the personal storage item is charged by simply placing the personal storage item on a charging base containing a wireless transmitter, instead of having to plug in the device or physically insert the battery into a power source. This makes the charging routine simpler and more convenient than physically connecting the system to a wall outlet each time charging is required.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
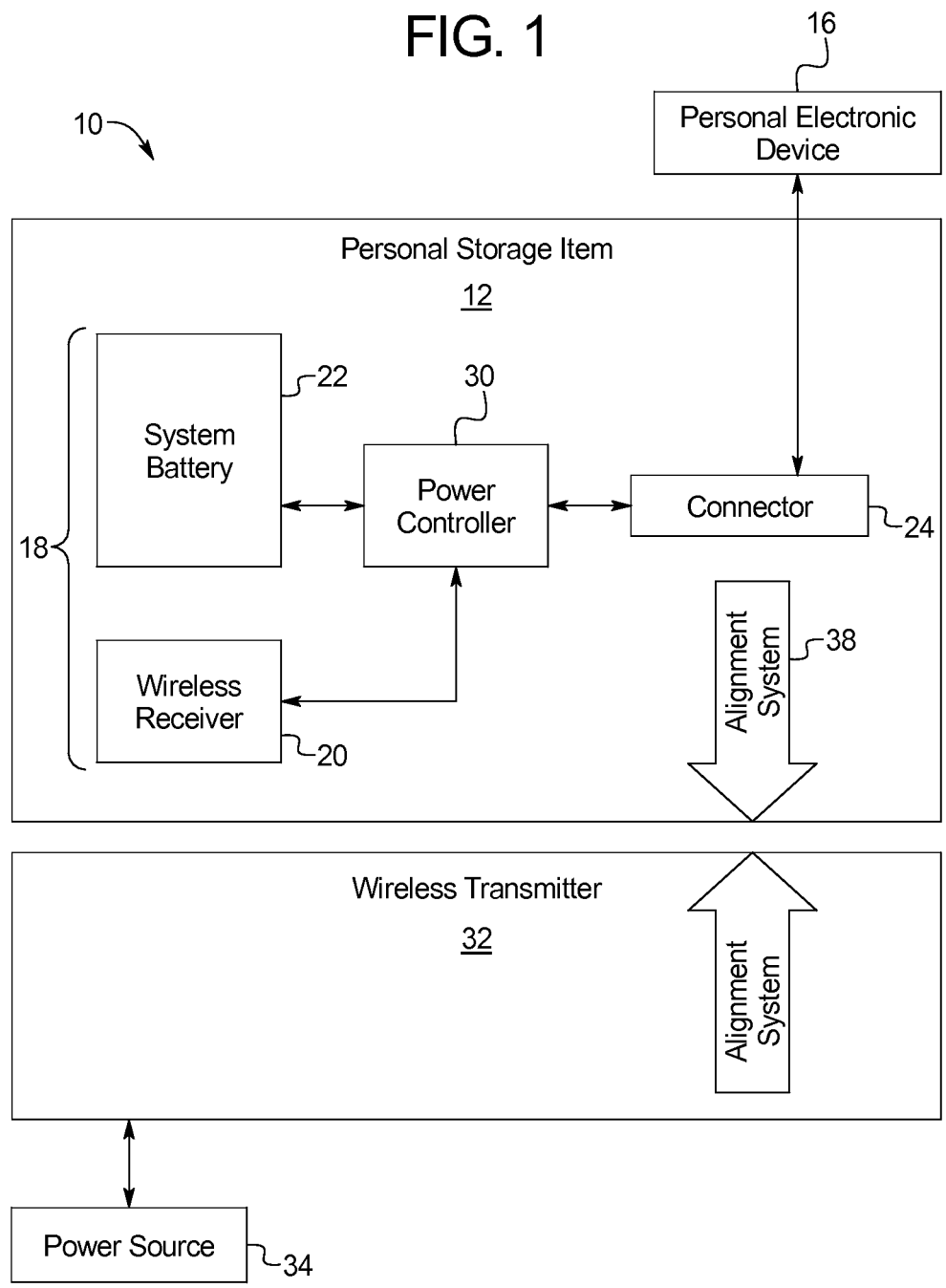
FIG. 1 is a schematic of an embodiment of the wireless personal electronic charging system disclosed herein.

The present disclosure provides a wireless personal electronic charging system 10 comprising a personal storage item 12 including a storage location 14 for a portable electronic device 16. In an example, the personal storage item 12 may be a personal bag or an article of clothing. For example, the personal storage item 12 may be a purse or messenger bag. The storage location 14 may be a pocket or any suitable space for receiving a personal electronic device 16 within the personal storage item 12. Further, the storage location 14 may be suitable for receiving a personal electronic device 16 having a case 15 attached thereto for protective or decorative purposes.

As shown in FIG. 1, the personal storage item 12 further includes a power section 18 including a wireless induction charger receiver 20 and a system battery 22 configured to receive and store power from the wireless induction charger receiver 20.

Figure 2:
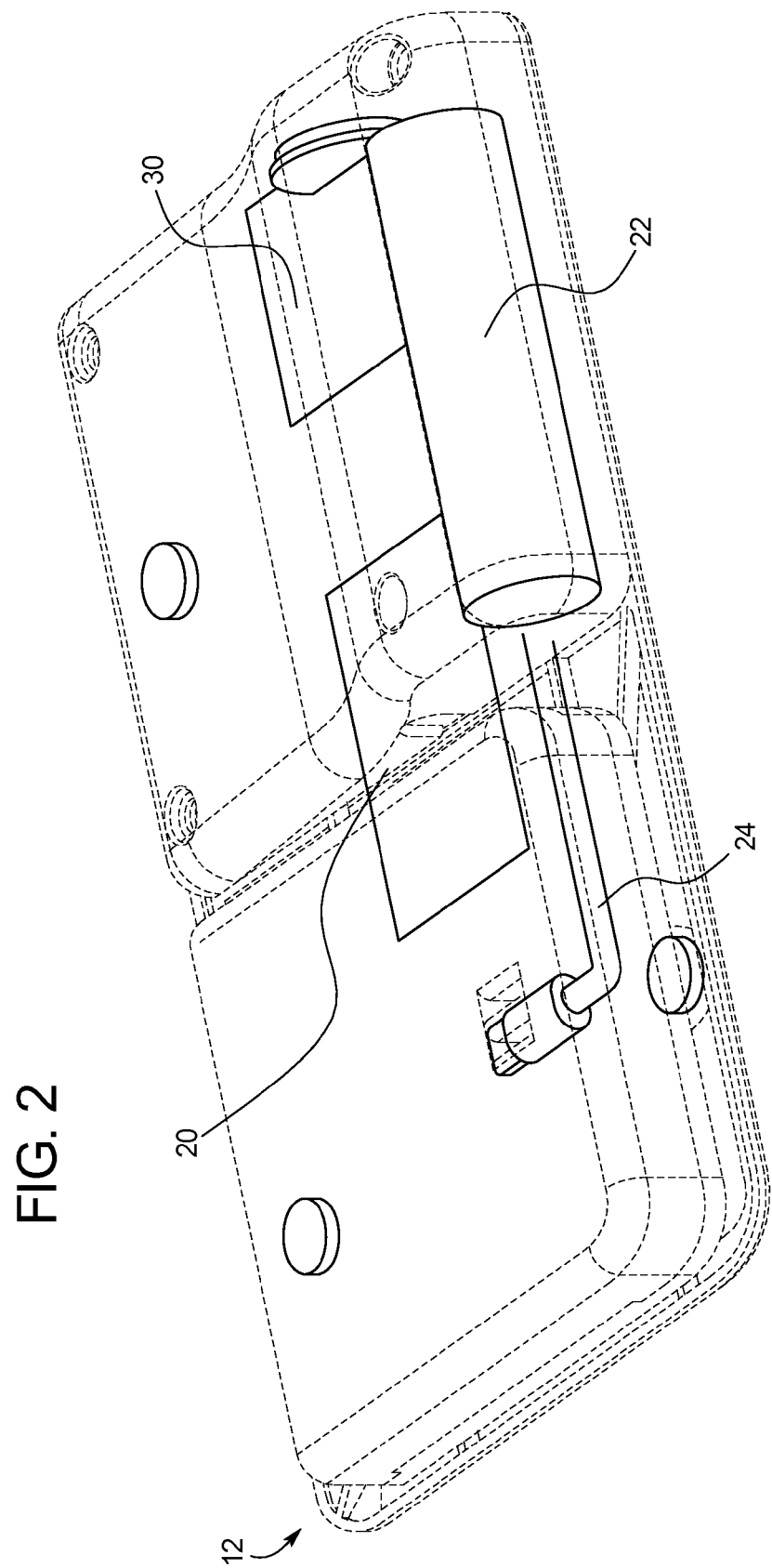
FIG. 2 is a perspective view of an example of elements of the system found in a personal storage item.

As shown in FIG. 2, the elements of the wireless personal electronic charging system 10 found within the personal storage item 12 further include a connector 24 in electrical communication with the power section 18 (i.e., the wireless induction charger receiver 20 and the system battery 22). When a portable electronic device 16 including a device battery 26 is placed within the storage location 14 in electrical communication with the connector 24, the connector 24 transfers power from the power section 18 to the device battery 26. The connector 24 may include a 30-pin connector, a 9-pin connector, a mini USB connector, a micro USB connector, or combinations thereof, appropriately configured to mate with a specific portable electronic device 16. For purposes of clarity, in the example shown, the connector 24 is simply mini USB connector.

Figure 3:
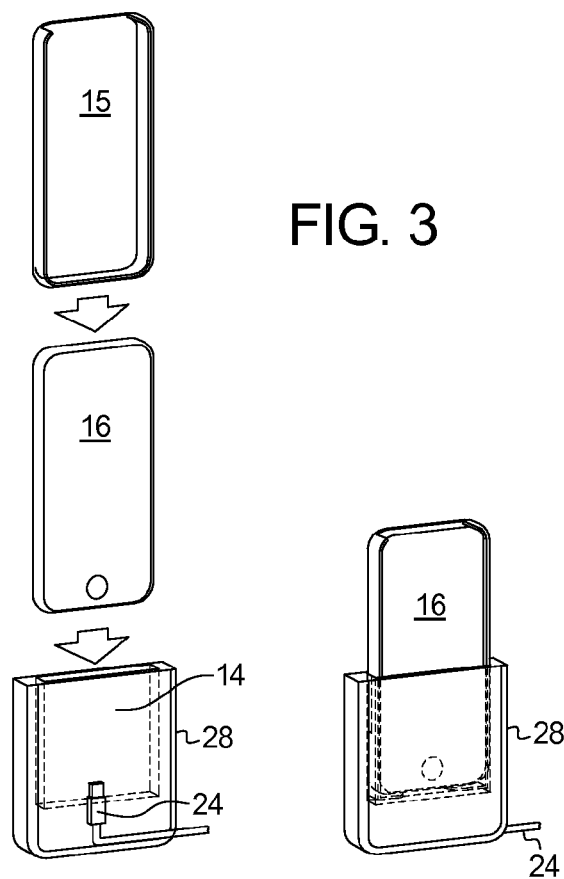
FIG. 3 is a perspective view of an example of a docking system.

As shown in FIG. 3, the system 10 may further include a docking system 28 located within the storage location 14. The docking system 28 may be configured such that the weight of the portable electronic device 16 facilitates an electrical connection between the connector 24 and the device battery 26 when the portable electronic device 16 is placed in the docking system 28 and the docketing system 28 is oriented in a connection-making orientation. In other words, the portable electronic device 16 may be simply placed in the storage location 14 and gravity facilitates an electrical connection between the connector 24 and the device battery 26. The user does not need to spend time aligning and connecting the personal electronic device 16 with the connector 24.

The docking system 28 may be configured to receive a personal electronic device 16 having a case 15 attached to the personal electronic device 16, as shown in FIG. 3. The case 15 may be any suitable case that may function as a protective or decorative cover for the personal electronic device 16. Notwithstanding the case 15 attached to the personal electronic device 16, the docking system 28 facilitates connection between the personal electronic device 16 and the connector 24. In other words, the user does not need to remove the case 15 in order for the connector 24 to connect to the personal electronic device 16.

In order for the portable electronic device 16 to mate with the connector 24 through the force of gravity and without specific manipulation by the user beyond placing the portable electronic device 16 at least partially into the storage location 14, the configuration of the storage location 14 and the position of the connector 24 must be precisely adapted to mate. For example, the internal sidewalls of the storage location 14 may be tapered (slightly or more pronounced) to form a funnel to assist the appropriate placement of the portable electronic device 16. The connector 24 may be located along the lower wall of the storage location 14 such that it extends above the lower wall a distance greater than the minimum distance required to make the connection. In doing so, the lower wall will not prevent the portable electronic device 16 from seating fully onto the connector 24. As a result, the user may mate the connector 24 and the portable electronic device 16 with minimal effort.

Figure 4:
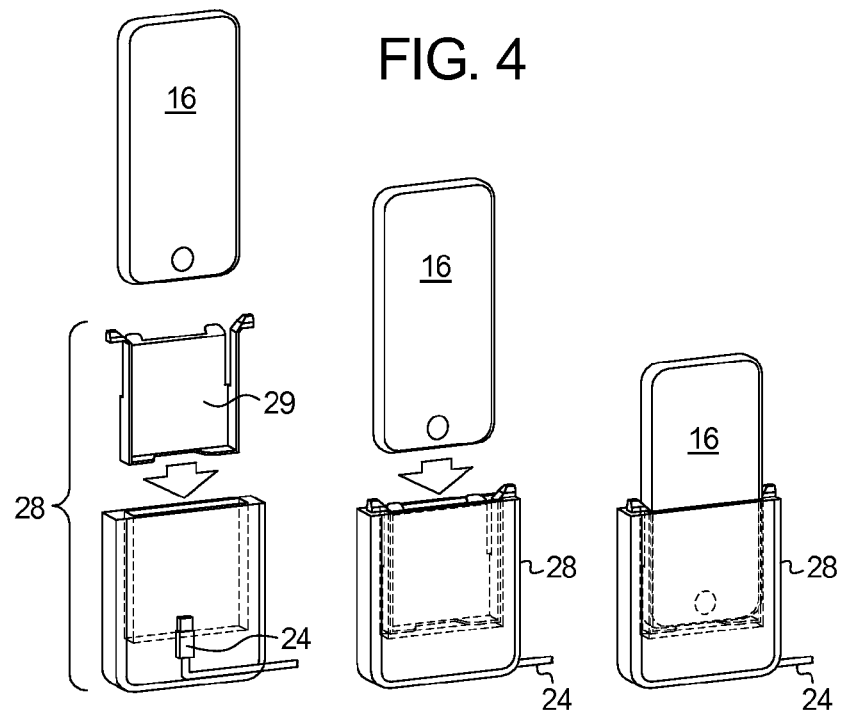
FIG. 4 is a perspective view of another example of a docking system.

A removable sleeve 29 may be used to improve the fit and alignment of the portable electronic device 16 within the storage location 14. As shown in FIG. 4, the docking system 28 the removable sleeve 29 that may be inserted into the docking system 28 to more closely align the portable electronic device 16 and the connector 24. The use of a removable sleeve 29 enables the connector 24 to make an easy connection to a variety of personal electronic devices 16 within a given storage location 14 configuration. In other words, a single pocket may be adapted to fit numerous personal electronic devices 16 using appropriate removable sleeves 29. As is easily understood based on the description provided, this feature may greatly improve the versatility of the personal storage item 12.

A power controller 30 may be used to increase the intelligence of the system 10. For example, in the embodiment shown in FIG. 2, the system 10 may include a power controller 30 in communication with the wireless induction charger receiver 20, the system battery 22, and the connector 24. The purpose of the power controller 30 is to appropriately route power throughout the system 10. For example, the power controller 30 directs power received from the wireless induction charger receiver 20 to the device battery 26 when the connector 24 is connected to the portable electronic device 26 and the device battery 26 is not fully charged. When the device battery 26 is fully charged or the personal electronic device 16 is not connected, the power controller 30 may direct the power to the storage battery 22. Additional description of the operation of the power controller 30 is provided with respect to FIG. 7 below.

Figure 5:
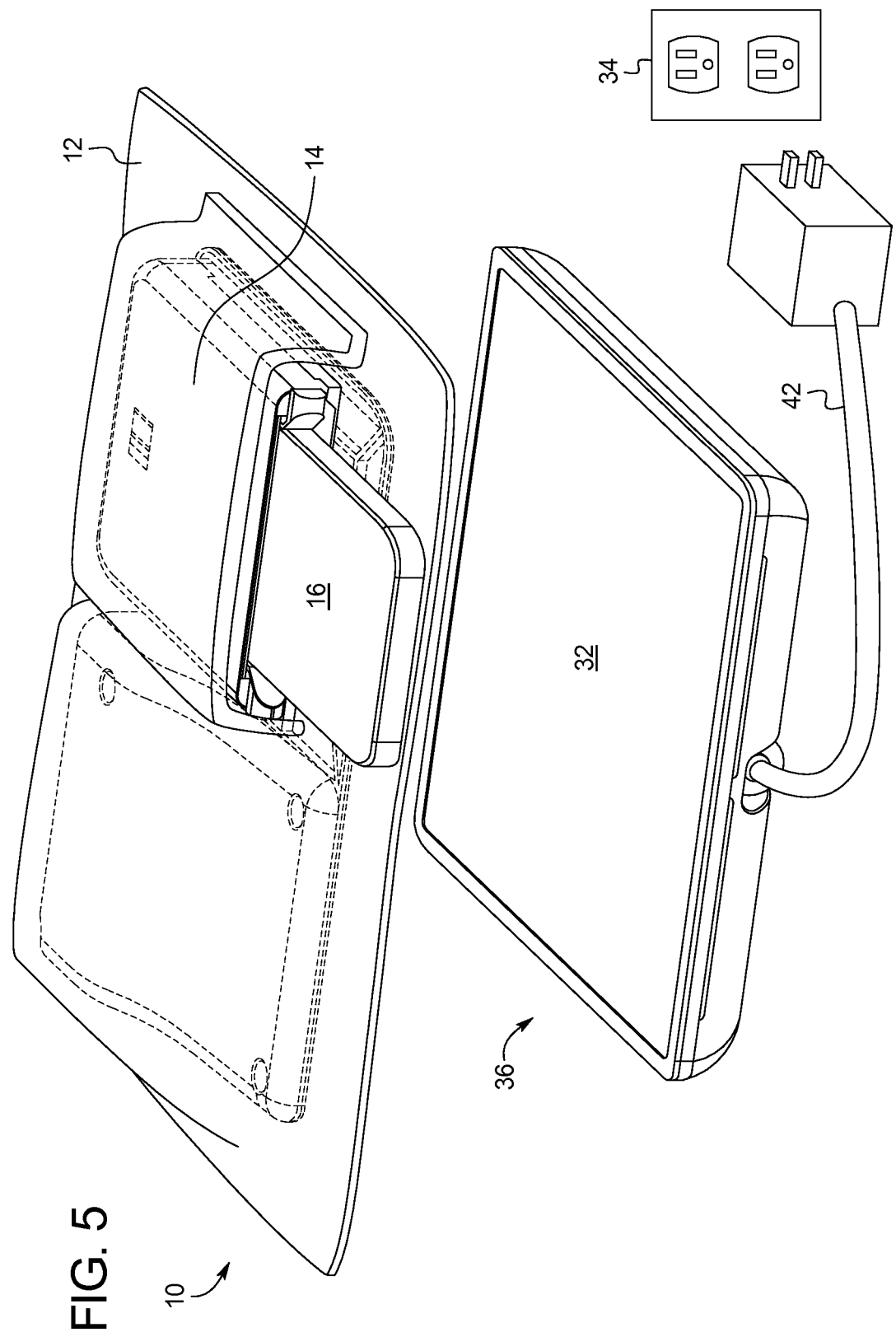
FIG. 5 is a perspective view of an embodiment of elements of the system found in a personal storage item and a charging base.

As shown in FIG. 5, the system 10 may include a wireless induction charger transmitter 32 embodied in a charging base 36 configured to receive power from a power source 34. When the personal storage item 12 is placed on the charging base 36, the wireless induction charger receiver 20 receives power wirelessly from the wireless induction charger transmitter 32.

Figure 6:
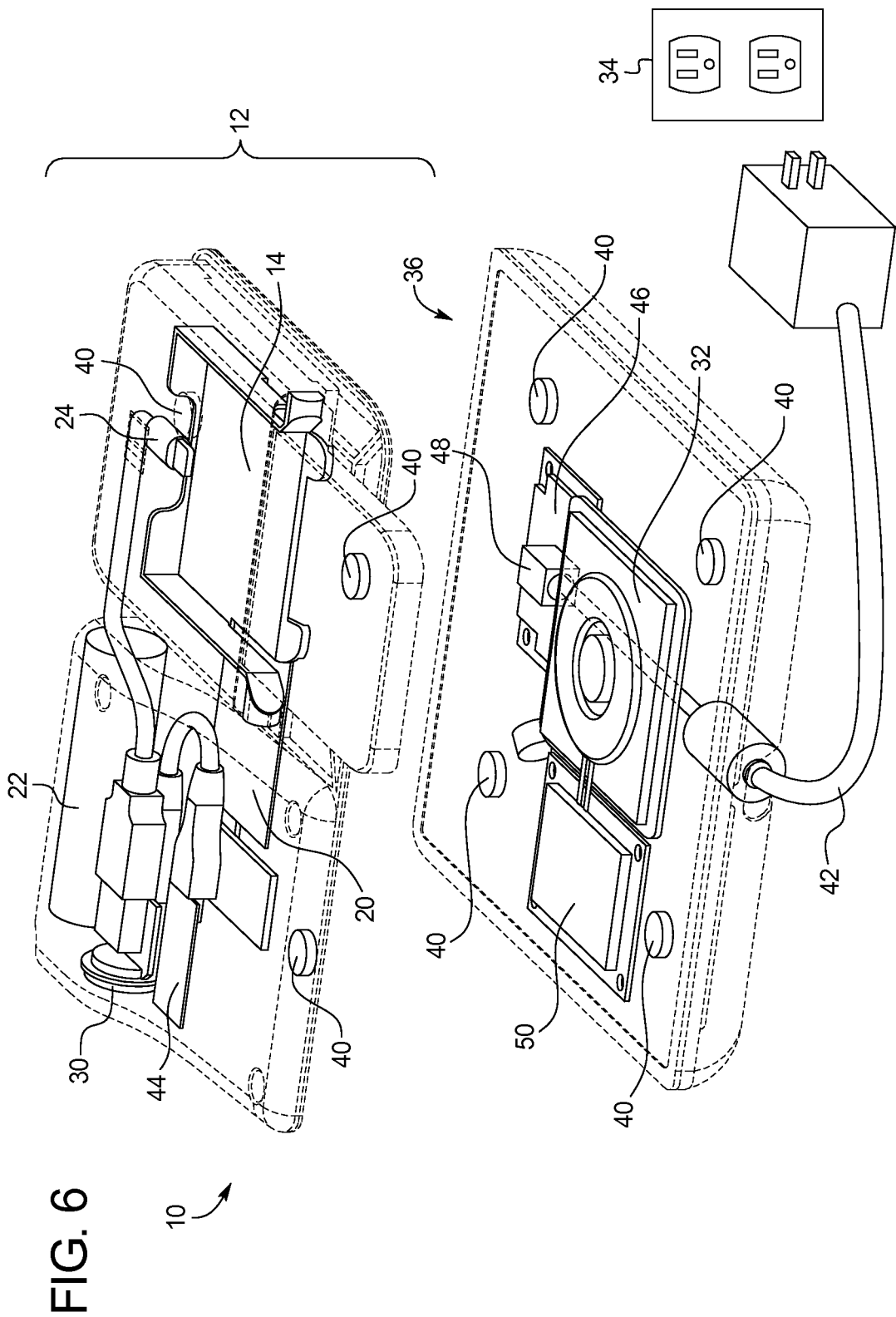
FIG. 6 is the perspective view of an embodiment of elements of the system found in a personal storage item and a charging base shown in FIG. 5, with the outer layers shown in phantom to provide a view of the internal components.

As shown in FIG. 6, the shape of the wireless induction charger receiver 20 is typically thin and rectangular. The transfer of power between the wireless induction charger transmitter 32 and the wireless induction charger receiver 20 is optimized when they are aligned as close to coplanar as practical. Accordingly, the wireless induction charger receiver 20 is located within the personal storage item 12 approximately planar with an exterior surface such that the personal storage item 12 may be placed on the charging base 36 to optimize the power transfer. The placement within an exterior surface of the personal storage item 12 has the additional advantage of minimizing its intrusion into the storage capacity of the personal storage item 12. In other words, by maximizing the induction surface area of wireless induction charger receiver 20, the power transfer between the wireless induction charger receiver 20 and the wireless induction charger transmitter 32 is improved. Further, by placing the wireless induction charger receiver 20 in a position such that it minimally invades the interior of the personal storage item 12, the storage capacity of the personal storage item 12 is not sacrificed.

As further shown in FIG. 6, the charging base 36 and the personal storage item 12 may include an alignment system that enables proper alignment between the wireless induction charger transmitter 32 and the wireless induction charger receiver 20 for power transfer to occur. For example, as shown in FIG. 6, the charging base 36 and the personal storage item 12 each may include corresponding magnets 40 that attract each other to align the wireless induction charger receiver 20 with the wireless induction charger transmitter 32. The magnets 40 may be strong enough to secure the personal storage item 12 to the charging base 36, but not so strong that removing the personal storage item 12 from the charging base 36 is strenuous. The location of the magnets 40 enables a user to make an appropriate alignment of the personal storage item 12 to the charging base 36 without needing to be particularly precise in placement; the personal storage item 12 may be guided into position by the attractive force of the magnets 40.

While the alignment system is shown and described as a set of corresponding magnets 40 in the personal storage item 12 to the charging base 36, it is contemplated that variations of the alignment system may be implemented. For example, the personal storage item 12 and the charging base 36 may have specially configured mating surfaces, slots, pegs, etc. Alternatively, the charging base 36 may have walls that vertically extend from the perimeter of the charging base 36. Upon placing the personal storage item 12 on the charging base 36 within the walls, the wireless induction charger receiver 20 is automatically properly aligned with the wireless induction transmitter 32.

As shown in FIG. 6, the wireless personal electronic charging system 10 the wireless induction charger transmitter 32 includes a power cord 42 adapted to connect the wireless induction charger transmitter 32 to a power source 34. The wireless induction charger transmitter 32 may further include a transmitter light emitting diode (LED) board 46, an AC adaptor port 48, and a transmitter power controller 50.

In the example shown in FIG. 6, the personal storage item 12 further includes a power section 18 including a wireless induction charger receiver 20 and a system battery 22 configured to receive and store power from the wireless induction charger receiver 20. The power section 18 may further include a USB port 44. The personal storage item 12 also includes a connector 24 in electrical communication with the power section 18. When a portable electronic device 16 including a device battery 26 is located within the storage location 14, the connector 24 is also in electrical communication with the device battery 26.

When the wireless induction charger transmitter 32 is connected to a power source 34 and the personal storage item 12 is placed on the wireless induction charger transmitter 32, the wireless induction charger receiver 20 receives power wirelessly from the wireless induction charger transmitter 32. The power section 18 may be removable from the personal storage item 12 such that the power section 18 may be separately placed on the wireless induction charger transmitter 32 for the wireless induction charger receiver 20 to receive power.

Figure 7:
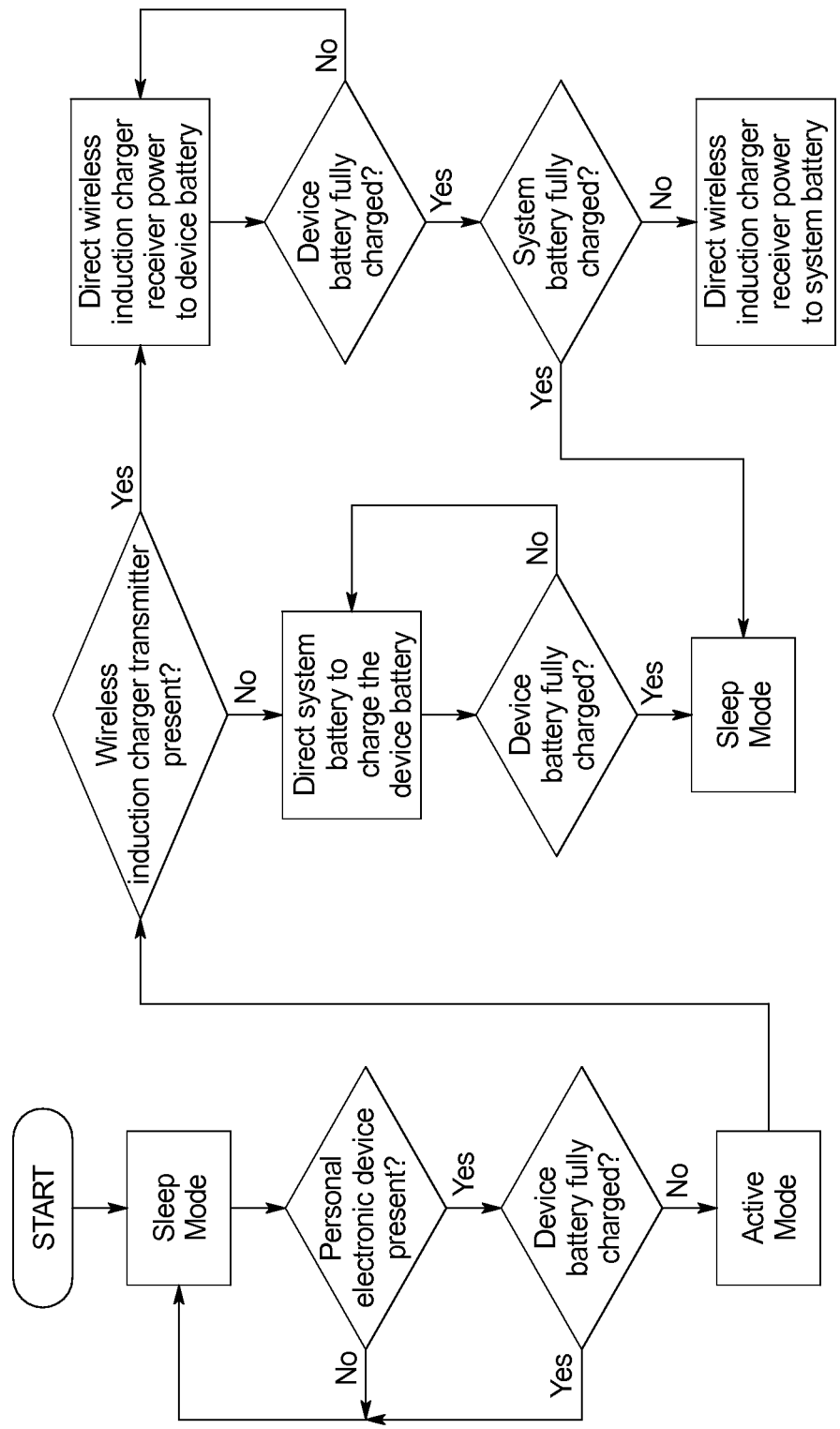
FIG. 7 is a flow chart illustrating an example of a decision tree embodied in a power controller.

In one example of the system 10, the personal storage item 12 further comprises a power controller 30 in communication with the wireless induction charger receiver 20, the system battery 22, and the connector 24. The power controller 30 directs power within the system 10. FIG. 7 depicts a flowchart illustrating various examples of power flow within the wireless personal electronic charging system 10, as controlled by the power controller 30. For example, if a personal electronic device 16 is present (i.e., the connector 24 is in electrical communication with a personal electronic device 16) including a device battery 26 that is not fully charged, and the wireless induction charger transmitter 32 is present, then the power controller 30 directs power from the wireless induction charger receiver 20 to the device battery 26. Once the device battery 26 is fully charged, the power controller 30 may then direct power from the wireless induction charger receiver 20 to the system battery 22. Alternatively, if the personal electronic device 16 having a device battery that is not fully charged is present, and the wireless induction charger transmitter 32 is not present, then the power controller may cause the system battery 22 to charge the device battery 26.

In addition, the wireless personal electronic charging system 10 may include a global location detection system, such as a GPS, that may be used to locate the personal storage item 12 in the case of loss or theft. For example, if the personal storage item 12 was lost, with or without the personal electronic device 16 contained within the personal storage item 12, the personal storage item 12 may be located and retrieved based on the global location detection system.

The wireless personal electronic charging system 10 may also provide for communication between the personal electronic device 16 and the power section 18. For example, the personal electronic device 16 may include a software application that communicates with the power section 18 (alternatively, directly with either the power controller 30 and/or the system battery 22) to determine the amount of power stored in the system battery 22. The application may then indicate through the personal electronic device 16 the amount of battery power remaining in the system battery 22 via a mobile application on the user's personal electronic device 16. The communication between the personal electronic device 16 and the power section 18 may be made via Bluetooth or other wireless communication standard, such as Wi-Fi, or cell phone networks, such as GSM, SPRS, CDMA, LTE, or two-way GPS location services, as will be recognized by those skilled in the art based on the disclosure provided herein.

The wireless personal electronic charging system 10 may further be adapted to operate within a hardware identification database system. For example, the wireless personal electronic charging system 10 may include an identifier, such as a microchip, that identifies the wireless personal electronic charging system 10. The identifier may include such information as an identification of the owner of the personal storage item 14, manufacturer's information, and/or the type of personal storage item 14. The hardware identification database system may include an encrypted Internet distributed list of hardware identifiers used to identify the source and location of the elements of the wireless personal electronic charging system 10. The hardware identification database system may rely on various communication standards such as Bluetooth, Wi-Fi, or cell phone networks, such as GSM, SPRS, CDMA, LTE, or two-way GPS location services.

The hardware based identification system may be used in combination with ancillary service providers. For example, the hardware based identification system may include identifiers that allow owners of the personal storage item 12 to participate in loyalty and VIP services provided by vendors who join the database network. For example, if an owner enters a vendor's location and the vendor identifies the wireless personal electronic charging system 10 (for example, the personal storage item 12), the vendor may reward the owner with loyalty or other special rewards.

For example, the location based features of the wireless personal electronic charging system 10 may include communication systems adapted to communicate with a vendor device located at a vendor's point of sale. The vendor device may receive a signal from the wireless personal electronic charging system 10, which indicates that the personal storage item 12 is present within the vendor's location. The vendor device may then confirm, through the hardware identification database network, that the personal storage item 12 has not been stolen, may receive a unique identification for that specific customer owning the personal storage item 12, or may receive other information. If the personal storage item 12 of the specific customer is registered with the vendor and/or the personal storage item 12 is connected to the customer's loyalty account, the customer associated with the account may receive benefits from the vendor. As shown, the communication systems provided herein may provide a number of functions, as will be recognized by those skilled in the art based on the disclosures provided herein.

In the primary examples used throughout the disclosure, the personal electronic device 16 is a portable electronic device, such as a smartphone. However, it is understood that the teachings provided may be applied to numerous variations of electronic devices, including cameras, tablets, computers, remote controls, etc., as will be recognized by those skilled in the art based on the teachings herein.

It should be noted that various changes and modifications to the embodiments described herein will be apparent to those skilled in the art. Such changes and modifications may be made without departing from the spirit and scope of the present invention and without diminishing its attendant advantages. For example, various embodiments of the method and portable electronic device may be provided based on various combinations of the features and functions from the subject matter provided herein.

We claim:

1. A wireless personal electronic charging system comprising:
 a personal storage item including:
  a storage location for a portable electronic device, wherein the storage location includes sidewalls and a lower wall;
  a power section including:
   a wireless induction charger receiver; and
   a system battery configured to receive and store power from the wireless induction charger receiver;
  a connector in electrical communication with the power section that extends through the lower wall of the storage location and, when a portable electronic device including a device battery is located within the storage location, is in electrical communication with the device battery, the connector transfers power from the power section to the device battery when the connector is connected to the portable electronic device; and a docking system located within the storage location, wherein the sidewalls of the storage location are tapered to funnel the electrical device towards the connector to facilitate an electrical connection between the connector and the device battery when the portable electronic device is placed in the docking system.

2. The system of claim 1 further comprising a power controller in communication with the wireless induction charger receiver, the system battery, and the connector, wherein the power controller directs power received from the wireless induction charger receiver to the device battery when the connector is connected to the portable electronic device and the device battery is not fully charged.

3. The system of claim 1 further comprising a power controller in communication with the wireless induction charger receiver, the system battery, and the connector, wherein the power controller directs power received from the wireless induction charger receiver to the system battery when a portable electronic device is connected to the connector and the device battery is fully charged or when a portable electronic device is not connected to the connector.

4. The system of claim 1 further comprising a wireless induction charger transmitter configured to receive power from a power source.

5. The system of claim 4 wherein the wireless induction charger transmitter is embodied in a charging base.

6. The system of claim 5 wherein, when the wireless induction charger transmitter is connected to a power source and the personal storage item is placed on the charging base, the wireless induction charger receiver receives power wirelessly from the wireless induction charger transmitter.

7. The system of claim 5 wherein the charging base and the personal storage item each include magnets that attract each other to align the wireless induction charger receiver with the wireless induction charger transmitter.

8. The system of claim 1 wherein the storage location is a pocket.

9. The system of claim 1 wherein the connector includes a 30-pin connector, a 9-pin connector, a mini USB connector, a micro USB connector, or combinations thereof.

10. The system of claim 1 wherein the personal storage item is a personal bag.

11. The system of claim 1 wherein the personal storage item is an article of clothing.

12. A wireless personal electronic charging system comprising:
a wireless induction charger transmitter including a power cord adapted to connect the wireless induction charger transmitter to a power source; and
a personal bag comprising:
a pocket for a portable electronic device;
a power section including:
a wireless induction charger receiver; and
a system battery configured to receive and store power from the wireless induction charger receiver;
a connector in electrical communication with the power section and, when a portable electronic device including a device battery is located within the pocket, in electrical communication with the device battery; and
a removable sleeve positioned within the pocket that improves the alignment of the portable device with the connector;
wherein, when the wireless induction charger transmitter is connected to a power source and the personal bag is placed on the wireless induction charger transmitter, the wireless induction charger receiver receives power wirelessly from the wireless induction charger transmitter;
further wherein, the connector transfers power from the power section to the device battery when the connector is connected to the portable electronic device.

13. The system of claim 12 wherein the personal bag further comprises a power controller in communication with the wireless induction charger receiver, the system battery, and the connector, wherein the power controller directs power received from the wireless induction charger receiver to the device battery when the connector is connected to the portable electronic device and the device battery is not fully charged.

14. The system of claim 12 wherein the personal bag further comprises a power controller in communication with the wireless induction charger receiver, the system battery, and the connector, wherein the power controller directs power received from the wireless induction charger receiver to the system battery when a portable electronic device is connected to the connector and the device battery is fully charged or when a portable electronic device is not connected to the connector.

15. The system of claim 12, further comprising a plurality of removable sleeves, wherein each sleeve is sized to fit one of a variety of different sized portable electronic devices.

* * * * *